(12) United States Patent
Baxter

(10) Patent No.: US 12,680,660 B2
(45) Date of Patent: Jul. 14, 2026

(54) TETHERED UAV PROVIDING BROAD AREA LIGHTING

(71) Applicant: SPORTSBEAMS LIGHTING, INC., Round Rock, TX (US)

(72) Inventor: Kevin C. Baxter, Tulsa, OK (US)

(73) Assignee: SPORTSBEAMS LIGHTING, INC., Taylor, TX (US)

( * ) Notice: Subject to any disclaimer, the term of this patent is extended or adjusted under 35 U.S.C. 154(b) by 0 days.

(21) Appl. No.: 19/263,115

(22) Filed: Jul. 8, 2025

(65) Prior Publication Data

US 2026/0009513 A1     Jan. 8, 2026

Related U.S. Application Data

(60) Provisional application No. 63/668,663, filed on Jul. 8, 2024.

(51) Int. Cl.

| | |
|---|---|
| *F21S 41/141* | (2018.01) |
| *B64U 10/60* | (2023.01) |
| *B64U 50/34* | (2023.01) |
| *B64U 101/30* | (2023.01) |
| *B64U 101/55* | (2023.01) |
| *F21V 23/00* | (2015.01) |
| *F21V 23/02* | (2006.01) |
| *F21Y 113/17* | (2016.01) |
| *F21Y 115/10* | (2016.01) |
| *H05B 45/10* | (2020.01) |

(52) U.S. Cl.
CPC ............ *F21S 41/141* (2018.01); *B64U 10/60* (2023.01); *B64U 50/34* (2023.01); *F21V 23/001* (2013.01); *F21V 23/02* (2013.01); *H05B 45/10* (2020.01); *B64D 2203/00*

(2013.01); *B64U 2101/30* (2023.01); *B64U 2101/55* (2023.01); *B64U 2201/202* (2023.01); *F21Y 2113/17* (2016.08); *F21Y 2115/10* (2016.08)

(58) Field of Classification Search
CPC ... B64U 10/60; B64U 2101/30; F21S 41/141; B64D 2203/00
See application file for complete search history.

(56) References Cited

U.S. PATENT DOCUMENTS

| | | | | |
|---|---|---|---|---|
| 10,498,566 | B2 * | 12/2019 | Kennedy | H04L 25/26 |
| 11,325,702 | B2 * | 5/2022 | Zawadzki | G05D 1/104 |
| 12,043,411 | B2 * | 7/2024 | Schumann | G05D 1/48 |
| 2021/0341128 | A1 * | 11/2021 | Abron | G09F 19/12 |
| 2021/0362856 | A1 * | 11/2021 | Hashiguchi | B64U 10/60 |
| 2022/0236745 | A1 * | 7/2022 | Fagiano | G05D 1/085 |
| 2023/0192328 | A1 * | 6/2023 | Estrada | A01K 91/02 |
| | | | | 244/110 C |
| 2024/0253819 | A1 * | 8/2024 | Mathew | H01B 7/282 |
| 2024/0286773 | A1 * | 8/2024 | Humann | B64U 10/60 |
| 2024/0417054 | A1 * | 12/2024 | Van Wiemeersch | |
| | | | | G03B 15/006 |

* cited by examiner

*Primary Examiner* — William N Harris
(74) *Attorney, Agent, or Firm* — Scott R. Zingerman

(57) ABSTRACT

A tethered UAV providing broad area lighting including a weatherproof drone; an electrically conductive tether; a high voltage power supply; an LED light engine which consumes at least 800 watts of power; an uninterruptible power source; and a voltage isolation stage. The weatherproof drone may or may not include a battery. The weatherproof drone, minus a battery, electrically conductive tether, and LED light engine weigh less than 4.4 pounds. The LED light engine produces 5 footcandles or more over an area greater than 50 feet in diameter.

24 Claims, 4 Drawing Sheets

TETHERED UAV PROVIDING BROAD AREA LIGHTING

CROSS-REFERENCE TO RELATED CASES

This application claims the benefit of U.S. provisional patent application Ser. No. 63/668,663, filed on Jul. 8, 2025, and incorporates such provisional application by reference into this disclosure as if fully set out at this point.

FIELD OF THE INVENTION

This invention relates, generally to broad area lighting for the entertainment industries, construction industries, and for government agencies operating in remote locations requiring lighting in a rapid deployment fashion.

BACKGROUND OF THE INVENTION

Drones have become ubiquitous in serving the camera needs of motion pictures, construction, surveying, and government first responders, even more so for the world's armies in warfare. LED lighting for the photography and motion picture industries have been available for more than 20 years, and recently has been introduced to drones for lighting scenes. The delivery costs of supplying a manlift for lighting support including delivery, rental, rigging, and manpower have become enormous and these drones, with motion picture illumination level LEDs, can replace those manlift solutions and cut those costs substantially.

The problem is that motion picture illumination by drones is considered a commercial operation of the drones and that requires that the drones be operated by FAA licensed pilots, and there needs to be an approved FAA waiver for the time and place of operation. The pilots add cost and FAA waivers can take weeks to be approved. Most film productions have schedules that vary from day to day and predicting a precise time and place needed several weeks in advance seems unlikely. Also, the batteries required for lighting are heavy and seriously limit the flight time, requiring constant landing and the replacement of fresh batteries. This is not compatible with efficient film making.

Similarly, first responders such as firemen and police, and highway patrol officers could use this type of drone mounted lighting for their disaster scenes. Quickly deployable overhead lighting would be very useful for first responders to car wrecks, fires, murder investigations, and such. The problem is that even if a firefighter were to pass a pilot's license, he still wouldn't know when and where to file for a flight waiver in advance.

The FAA came up with a great solution for that problem. They made an exception to the Part 107 rules that specifically carves out use for these government responders. A drone that weighs no more than 4.4 pounds, is tethered, and stays below 150' can be used by government personnel performing their standard duties with no waivers and no pilot's license needed. But the battery problem remains, a short flight time is a big issue.

SUMMARY OF THE INVENTION

The present invention is a tethered UAV providing broad area lighting including, preferably, a weatherproof drone; an electrically conductive tether; a high voltage power supply; an LED light engine which consumes at least 800 watts of power; an uninterruptible power source; and a voltage isolation stage. The weatherproof drone may or may not include a battery. The weatherproof drone, minus a battery, electrically conductive tether, and LED light engine weigh less than 4.4 pounds. The LED light engine produces 5 footcandles or more over an area greater than 50 feet in diameter. The drone may include a housing that is preferably weatherproof to the extent possible, or at least weather resistant.

The UAV of the present disclosure may be tethered to a base which may include a battery in electrical communication with the drone via the tether. The uninterruptable power supply may be three (3) phase AC and may be adapted for dimming the LEDs in the LED light engine. The tether may be connected to the drone on one end and spooled on a reel at the other such that the tether is (retractactably) fed from the reel. The reel may be secured to the base. The tethered UAV of the present disclosure may also include a down converter.

The inventive device provides a safe, all-weather, drone based light source that can operate indefinitely. Basically, a light pole in a briefcase. The inventive device is a drone that is capable of lifting LED based lights, and it does not need a battery because it is powered by a tether, a conductive tether of ground powered wires. These wires are as small as possible to reduce weight, which requires the voltage going through them to be very high. This high voltage keeps the electrical current very low, which allows for small light wire. But the high voltage has to be converted to low voltage, usually between 6-48 volts DC for use by the drone and the LED lighting. #22 gauge wire can carry an absolute maximum of 6.4 amps. #22 gauge wire, coated with a thin jacket of Teflon can have an insulation rating of 600 volts. Ideally the high voltage through the wire introduced would be less than 600 volts, with 300-400 volts being ideal, not by limitation. There would be an electrical isolation point along the electrical path before the tether. The current in #22 wire should be less than the 6.4 amp limit, ideally about 4 amps or less, but not by limitation. 400 volts at 4 amps would allow 1600 watts at the drone, to be shared between lighting and propulsion. 100' of this commercially available wire could weigh less than a pound. Very lightweight. Having no battery also helps make the basic craft even more lightweight as well.

The LEDs would be optimized for the industry needs, construction, road building and emergency services would need the maximum lumen efficiency. The motion picture and entertainment industries would ideally need warm white, cool white, +90 color rendering index (CRI), and RGB, RGBW, RGBWA, Bi-color, which is cool white and warm white and possibly a full host of additional colors, like lime. Each channel of these individual colors would be individually dimmable. The LEDs would have small heatsinks, cooled by the propwash of the drone's propellers, very lightweight. Ideally the LED engines could be readily exchanged with other colors, a swap-out system.

OSHA generally requires a minimum of 5 footcandles of illumination for most occupations. First responders are exempt from this, but they would benefit from 5 foot candles if it could be achieved in the field. Construction companies strictly adhere to OSHA regulations, and this would solve their 5 footcandle problem. The area illuminated by this drone should be at least 150' in diameter and would require less than 90,000 lumens. At this level of illumination and size of coverage, the inventive device needs LEDs to consume at least 800 watts of power.

Mains power would be provided by mains, or a generator, or battery/inverter combo to the 400 volt DC power supply. 400 volt DC in the small tether wires could become a dangerous risk in wet conditions if the insulation wires got cut or nicked and so the inventive device would have an electrical isolation layer in the voltage path before it got to the small wires. Because a battery/inverter that is based in a squad car is effectively isolated and not grounded, this could possibly qualify as the isolation barrier requirement. The device would also have an uninterruptable power supply (UPS) that was feeding the 400 volt power supply. That way if power was interrupted the UPS would continue to power the 400 volt power supply, but the drone would be signaled (instructed) to immediately land while the mains were reconnected. The firefighter's version of this inventive device could have a small battery onboard for an emergency landing, rather than a UPS because of the FAA exemption for them. For other industries the UPS would be required. The reason for a UPS rather than a small battery is regulatory in nature, and can best be explained by the following:

Around the time of 2016 the FAA was asked by a paragliding association for a clarification regarding tethered devices. The FAA's clarification letter said that since 1957 most tethered objects under 5 pounds were considered kites and were not subject to FAA regulations other than staying below 150' from the ground, even at night. If a device detaches from the tether and can fly on its own, in some form, then it becomes regulated by the FAA. Good examples of this are balloons and gliders. If a drone with no battery was detached from its tether, it would be unpowered, and not be able to fly at all and would fall, which means it is legally a kite. No pilot's license required, no waivers, no Notice To Airmen (NOTAM) required. A tethered lighting drone with no battery would allow the motion picture and construction industries, to name a few, by example, but not by limitation, could operate instantly without FAA regulation, other than staying below 150' from the ground. A 100' tether that was used on top of a 100' building would violate the FAA rules, because that would allow a drone to operate 200' above the ground. The inventive device could be used effectively in the higher altitude or higher weight class FAA regulated air space, but the larger market quantities would be in the lower and lesser regulated space.

This device could use a high voltage AC tether, it might be simpler than the DC version. The high voltage AC would need to be isolated before being introduced to the tether. This could be done by using a transformer, which could be a step-up transformer or simply an isolation transformer. It could be 50 or 60 hertz, or it could be a much higher frequency, like is used in military aircraft, to help minimize the size of the inductors and capacitors needed in the AC to DC converter that would be located in the drone, replacing the DC/DC converter previously mentioned. It could be multi-phase, like 3 phase, to help ease the voltage ripple from the zero crossings, but would require 3 tether conductors, not just 2.

The inventive device, with its super lightweight construction, electric isolation barrier, and its UPS could do this safely and affordably in compliance with all US laws and regulations. "Super lightweight" in this situation means, a ground powered lighting drone, with little or no onboard battery, that would weigh less than 4.4 pounds including the tether. This type of drone needs to light an area larger than 50' in diameter to at least 5 foot candles, which equates to 10,000 lumens or approximately 80 watts of LED power.

"Light weight" versions would be defined as, a ground powered lighting drone, with no onboard battery, that would weigh less than 5 pounds.

"Heavy" versions of the inventive device could have a much greater payload (bigger lights) that would cover a larger area and have greater footcandles. They might require a pilot's license and other regulations, but these could solve many situational needs with the inventive "light pole in a briefcase". These larger regulated versions could have a small emergency descent battery.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

Figure 1:
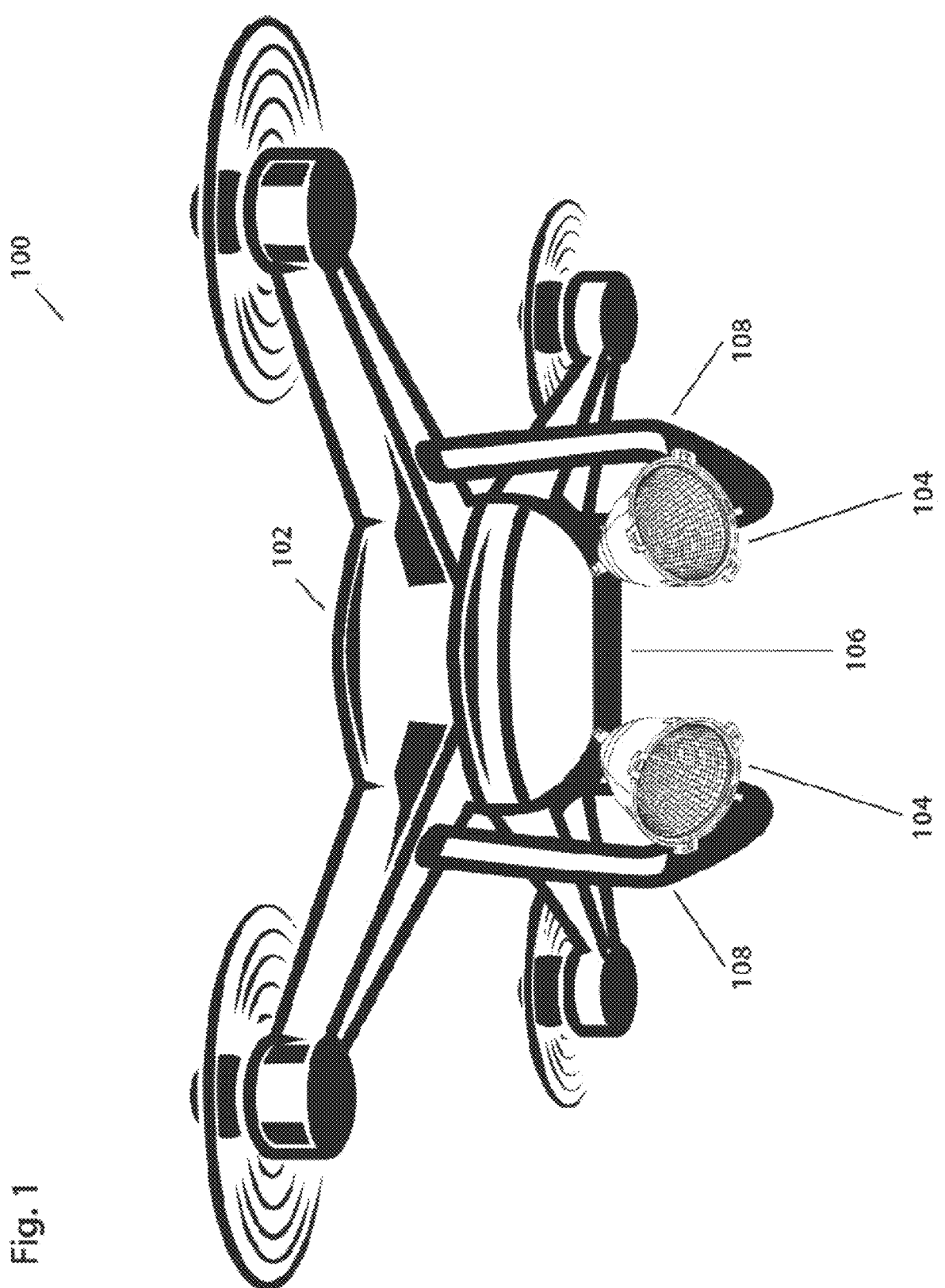
FIG. 1 illustrates a drone with LED lights (prior art).

FIG. 1 illustrates a drone with LED lights 100 (prior art). The drone 102 has LED fixtures 104 attached to its underside. The drone 102 also has a battery 106 attached to its underside. There is also landing gear 108.

Figure 2:
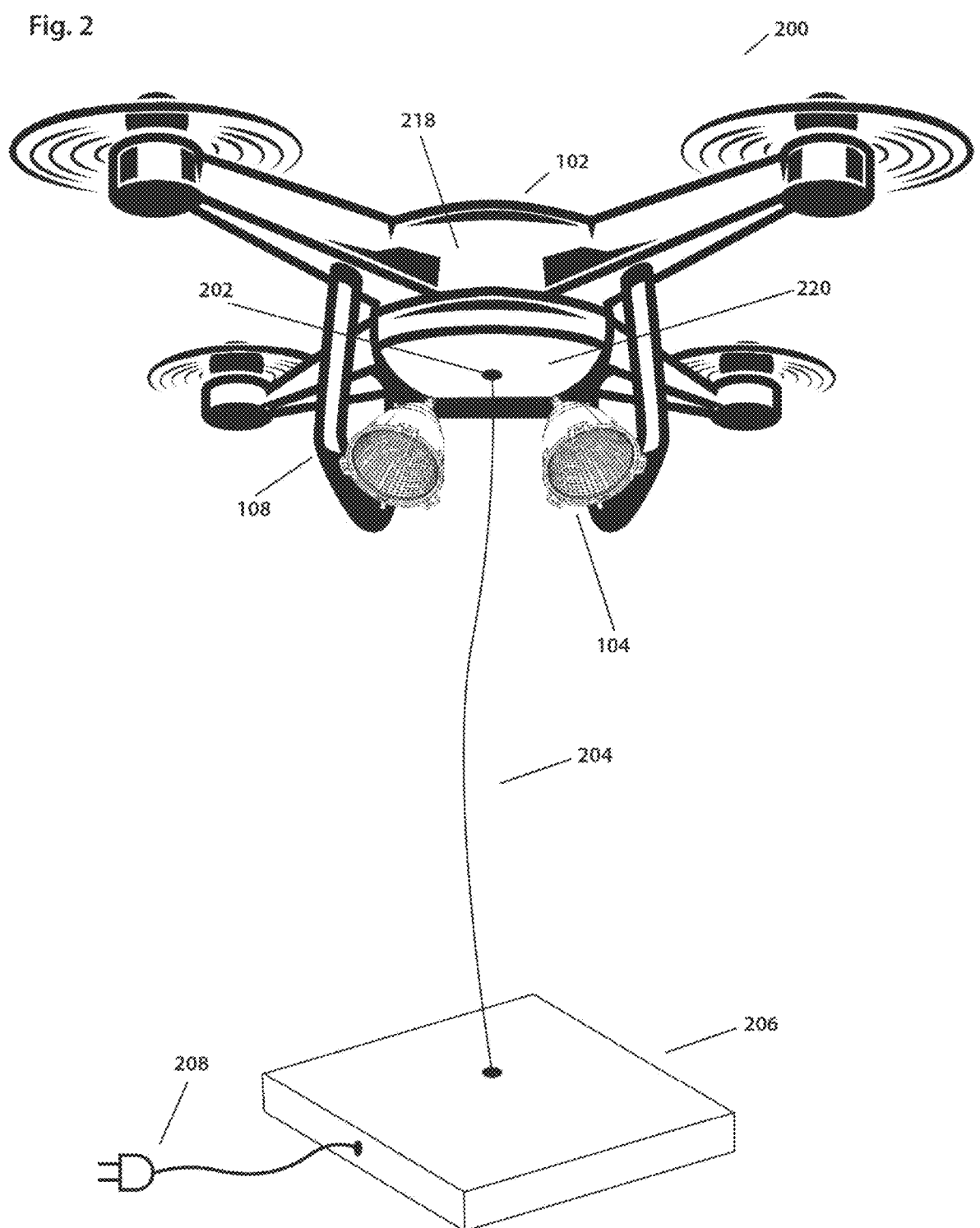
FIG. 2 depicts a ground powered and tethered drone with lights according to the present disclosure.

FIG. 2 shows the safe tethered drone system 200. The drone 102 and the LED fixtures 104 also have a high voltage attachment point 202 and a tether wire 204 which is connected to the launch/landing base 206 which is connected to the mains electricity 208. Unseen inside the launch/landing base 206 are a UPS 210 including a battery, high voltage DC power supply 212, (possibly AC/AC), a reel system 300 to dispense and retract the tether wire 204, and an electrical isolation layer 216 to electrically isolate the 400 DC going to the tether wires 204. The drone 102 has a weatherproof protective shell 218 and protected connections so that it can operate safely in wet or bad weather.

Most traditional drones 102 have a battery 106 attached in their back or to their underside. It could be possible for the UAV of the present invention to use a stock off-the-self drone 102 and make a battery shaped cartridge 220 that slides into the battery holder of the drone. This battery shaped cartridge 220 would support the LEDs 104, and contain the electronics for converting the high voltage to low voltage DC, as well as be an attachment point for the tether 204. This cartridge 220 would supply the correct voltage to the drone and LEDs, just like a battery does, but from the ground. Even the landing gear 108 could be a part of this cartridge 220, interlaced between the LED optics 104, as to block the LEDs 104 main optical energy.

Figure 3:
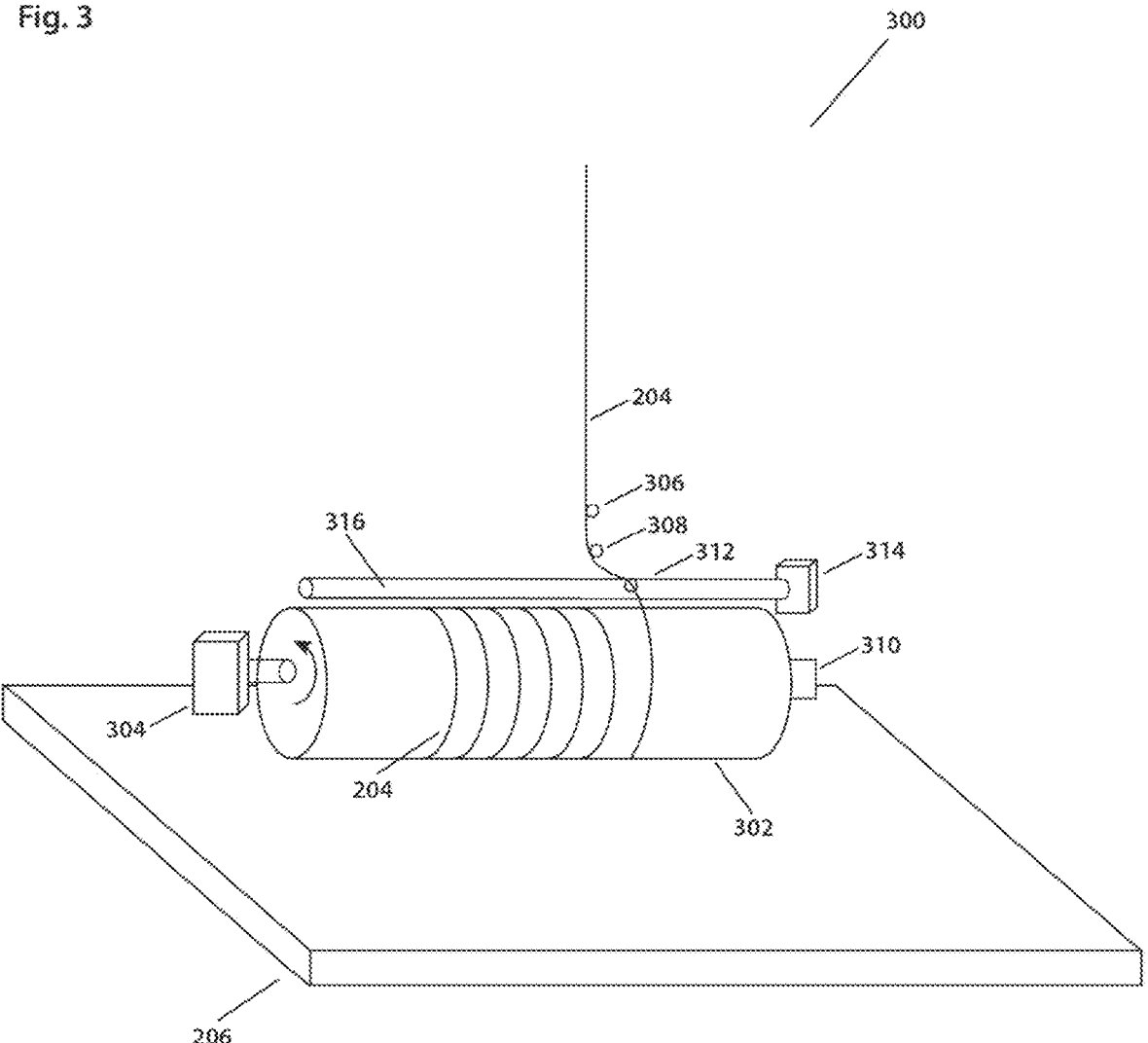
FIG. 3 depicts the reel system of the tethered UAV device of the present disclosure.

FIG. 3 shows the reel system 300 which consists of a mechanical reel 302, an actuator 304, which could be a stepper motor, a motor driving a friction clutch, or similar motivator to spin the reel and take up or let out the tether. The entire reel system 300 would fit in the base 206. There could be a tension detector 306, and a shock absorber 308, for when the tethered drone 200 hits the end of the tether 204. The tension detector 306 and shock absorber 308 could be incorporated together as one piece. Ideally there would be a slip ring 310 that would allow the 400V to be transferred to the reel 302 without spinning the 400 feed wire. It is a rotary electrical wiper, or slip-ring, similar to what is behind most modern automobile steering wheels. And lastly there should be a winding guide 312 that slowly moves the winding point along the mechanical reel so that the tether wire doesn't just pile up in one spot, the winding guide 312 moves back and forth to spread the tether wire 204 as it winds up. The winding guide 312 would ideally be motivated by a winding guide stepper motor 314 with a linear screw mechanism 316.

Figure 4:
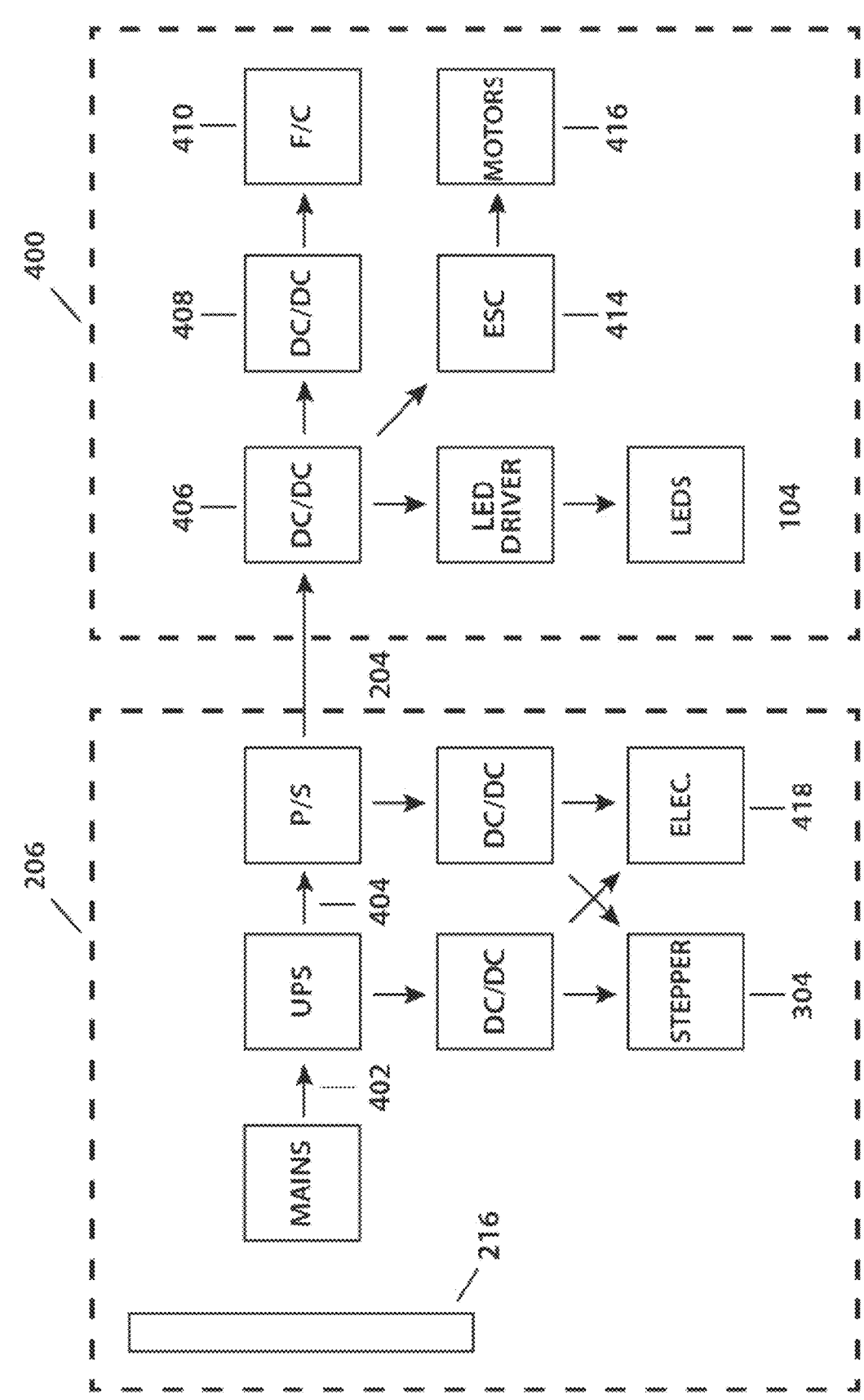
FIG. 4 is a block diagram of the power system of the tethered UAV providing broad area lighting

FIG. 4 a block diagram of the electrical paths 400 through the entire tethered UAV providing broad area lighting system 200. We start at the mains input 208 which could be connected to a squad car's inverter, or a standard household outlet, or a battery/inverter combination to give a few examples. That mains input 208 then connects 402 to the UPS 210. The UPS 210 needs to have its wattage capacity be slightly greater than is ever required by the high voltage power supply 212. The power supply 212 could be a transformer if it was an AC tether system. The battery in the UPS 210 only needs to be able to power the system for less than a minute, so it could be very small. The UPS 210 which then feeds 404 the high voltage power supply 212. The high voltage power supply could be almost any voltage but keeping it below 600V allows for more UL regulatory flexibility. A lower voltage than 300 V would mean bigger wires 204 and a weight penalty, requiring a bigger drone 102, 200, requiring bigger wire 204, requiring a bigger drone 102, 200, and so on.

The isolation layer 216 could be anywhere along the electrical path. Electrical isolation usually requires a transformer or pseudo-transformer based on inductance, either line-based frequency or high-frequency, between the mains input 208 and the UPS 210 at point 402, as part of the UPS 210, between the UPS 210 and the high voltage power supply 212 at point 404, as part of the high voltage power supply 212, or after the high voltage power supply 212. But the isolation layer 216 must occur before the 400 V reaches the tether wires 204, to separate it from ground. The UPS would include an inverter and a battery.

The high voltage travels through the tether wires 204 to the drone 102. Inside the modified drone 102 is a DC to DC or AC to DC down converter 406. This converter 406 can convert the high voltage down to a low 6-48 volts. Weight and size for this part are critical and for 1600 watts, it could easily weigh over several pounds by itself if using discrete components. But there is a part designed for server farms that is tiny, the size of a 40 pin DIP chip, extremely lightweight, and takes 380 VDC in and weighs an ounce or so, maybe two when you include a heatsink. The Vicor BCM400P500T1K8A31 can convert the 380 VDC down to 48 volts at up to 1,800 watts. Similar parts from the same family of modules can reduce to voltages as low as 12 VDC. The motors 416 and LEDs 104 don't have to down-convert the 380 volts to around 48 volts, the motors 416 and LEDs 104 could be wired for 380 VDC operation. The ESC 414 for this scenario could be a Fairchild FPAL30SL60 which is rated up to 600V. The flight electronics would still need a small down converter.

Ideally the drone would be weatherproof, not necessarily completely waterproof. There are drones that can dive into water, that can emerge, and fly away unscathed. The fishing hobby drones often do this as a matter of requirement. This drone simply needs to be able to work in most wet and inclement weather conditions, where electrical connections are somewhat protected, but not necessarily dunk-proof. Obviously freezing rain conditions are adverse to all flying craft, tethered or not.

There may need to be a second converter, a low voltage converter 408, for converting the 48 volts down to 6 volts for the flight computer 410 and similar components. The DC or AC to DC converter 406 feeds LED drivers 412 that feed the LEDs 104. The DC or AC to DC converter also feeds the electronic speed controller (ESC) 414 which feeds the flight motors 416.

The base 206 could hold a couple of actuators or motors 304, and a winding guide stepper motor 314, and electronics 418 which could be powered by a separate power supply 420, other than the high voltage power supply, or they could be powered by a down converter 422 which borrows power from the high voltage power supply 212.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A tethered UAV providing broad area lighting, consisting of:

a weather resistant drone;

an electrically conductive tether;

a high voltage power supply;

an LED light engine;

wherein said LED light engine consumes at least 800 watts of power;

wherein said weatherproof drone, minus a battery, said electrically conductive tether, and LED light engine together weigh less than 4.4 pounds;

an uninterruptible power source;

a voltage isolation stage;

wherein said LED light engine produces 5 footcandles or more over an area greater than 50 feet in diameter.

2. The tethered UAV of claim 1 further including a down converter.

3. The tethered UAV of claim 1 wherein said uninterruptable power supply is three (3) phase AC.

4. The tethered UAV of claim 1 wherein said LED light engine includes RGBW.

5. The tethered UAV of claim 1 wherein said LED light engine includes RGBWA.

6. The tethered UAV of claim 1 wherein said LED light engine is adapted for dimming.

7. The tethered UAV of claim 1 wherein said LED light engine includes bi-color LEDs.

8. The tethered UAV of claim 1 which does not include a battery.

9. The tethered UAV of claim 1 wherein said tether is in communication with a base including a battery.

10. The tethered UAV of claim 1 wherein said drone includes a battery.

11. The tethered UAV of claim 1 wherein said tether is fed from a reel supported by a base.

12. The tethered UAV of claim 1 wherein said drone includes a battery mount and a cartridge adapted to be secured in said battery mount.

13. A tethered UAV providing broad area lighting, consisting of:

a weatherproof drone;

an electrically conductive tether;

a high voltage power source;

at least one LED light engine;

wherein said at least one light engine consumes at least 800 watts of power;

an uninterruptible power supply;

a voltage isolation stage;

wherein said at least one LED light engine produces 5 footcandles or more over an area greater than 150 feet in diameter.

14. The tethered UAV of claim 13 further including a down converter.

15. The tethered UAV of claim 13 wherein said uninterruptable power supply is three (3) phase AC.

16. The tethered UAV of claim 13 wherein said at least one of said at least one LED light engine includes RGBW.

17. The tethered UAV of claim 13 wherein at least one of said at least one LED light engine includes RGBWA.

18. The tethered UAV of claim 13 wherein at least one of said at least one LED light engine is adapted for dimming.

19. The tethered UAV of claim 13 wherein at least one of said at least one LED light engine includes bi-color LEDs.

20. The tethered UAV of claim 13 which does not include a battery.

21. The tethered UAV of claim 13 wherein said tether is in communication with a base including a battery.

22. The tethered UAV of claim 13 wherein said drone includes a battery.

23. The tethered UAV of claim 13 wherein said tether is fed from a reel supported from a base.

24. The tethered UAV of claim 13 wherein said drone includes a battery mount and a cartridge adapted to be secured in said battery mount.

* * * * *